Oct. 3, 1961 B. C. THOMSON 3,002,330
CANE HARVESTER
Filed Dec. 8, 1958 9 Sheets-Sheet 1

FIG. I.

INVENTOR
Byron C. Thomson
BY Wilkinson, Mawhinney & Thiebaut
ATTORNEYS

Oct. 3, 1961   B. C. THOMSON   3,002,330
CANE HARVESTER
Filed Dec. 8, 1958   9 Sheets-Sheet 9

INVENTOR
Byron C. Thomson

BY Wilkinson, Mawhinney & Theibault
ATTORNEYS

United States Patent Office 3,002,330
Patented Oct. 3, 1961

3,002,330
CANE HARVESTER
Byron C. Thomson, Thibodaux, La., assignor, by mesne assignments, to Lamb Industries, Inc., Toledo, Ohio, a corporation of Delaware
Filed Dec. 8, 1958, Ser. No. 778,795
7 Claims. (Cl. 56—17)

The present invention relates to cane harvester and has for an object to provide a sugar cane harvester more suitable for the rough conditions found in many fields, particularly those where irrigation is used.

Another object of the invention is to provide a novel form of cane harvesters more particularly for use in tropical areas in which the harvester is mounted to a crawler-type tractor from which the harvester derives its propulsive power.

A further object of the invention resides in providing an improved cane harvester so constructed and arranged and carrying essential harvesting assemblies that it may be mounted upon a crawler tractor which is arranged to sustain all of the weight of the harvester when the latter is inoperative and the great majority of the weight when the harvester is in operating position, in which latter position part of the weight of the forward portion of the harvester may be assumed by a gauge or "crazy" wheel mounted swively beneath the forward portion of the harvester.

A still further object of the invention is to provide a swivel mounting of the harvester to the tractor to allow the tractor to rise and fall relatively to the harvester and the harvester to rise and fall relatively to the tractor without in any way disturbing the relationship between harvester and tractor.

A still further object of the invention is to provide an improved cane harvester in association with a crawler tractor in which conventional longitudinal and lateral passages for the cane stalks are all embodied in that portion of the harvester which extends forwardly of the endless tracks of the tractor to the end that the cane stalks may be deposited in heap rows at the side of the machine without interference from the movement of the endless tractor tracks and out of the path of the same.

The invention further contemplates the provision of controllable means for lifting the forward portion of the harvester to either completely remove the gauge wheel from contact with the ground, as where the harvester is being driven to or from the cane field, or to limit the down dipping movement of the forward part of the harvester to the end that the gauge wheel may ride up and down normal contours of the ground but will not drop into abnormally deep depressions.

The invention also has for a further object lateral adjustment of the forward gathering chains to better cope with "down" cane.

With the foregoing and other objects in view, the invention will be more fully described hereinafter, and will be more particularly pointed out in the claims appended hereto.

In the drawings, wherein like symbols refer to like or corresponding parts throughout the several views.

Referring more particularly to the drawings, 10 designates the frame of a crawler-type tractor, 11 the endless tracks or treads which are two in number, spaced apart and running about rear sprockets 12 and front sprockets 13. The engine of the tractor is designated at 14 and is probably best seen in FIGURE 8.

Figure 1:
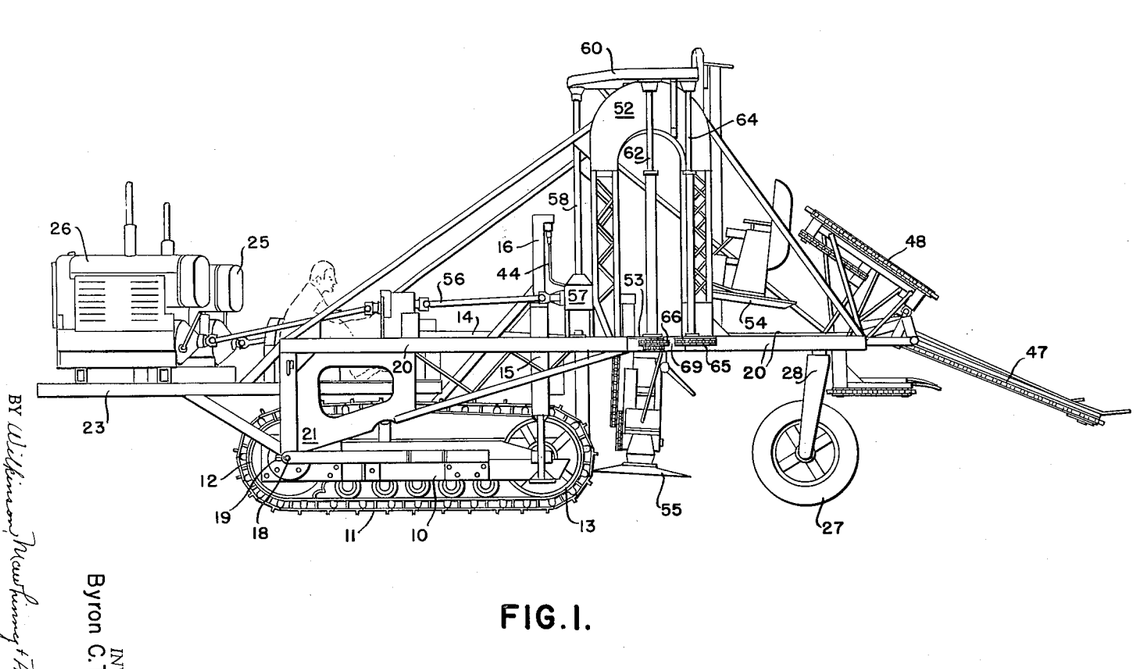
FIGURE 1 is an isometric view of a cane harvester constructed in accordance with the present invention shown in an operative position upon a crawler-type tractor with the gauge or "crazy" front wheel resting upon the surface of the ground in an operative position of the harvester to gather, cut and pile the cane.
Figures 5, 6:
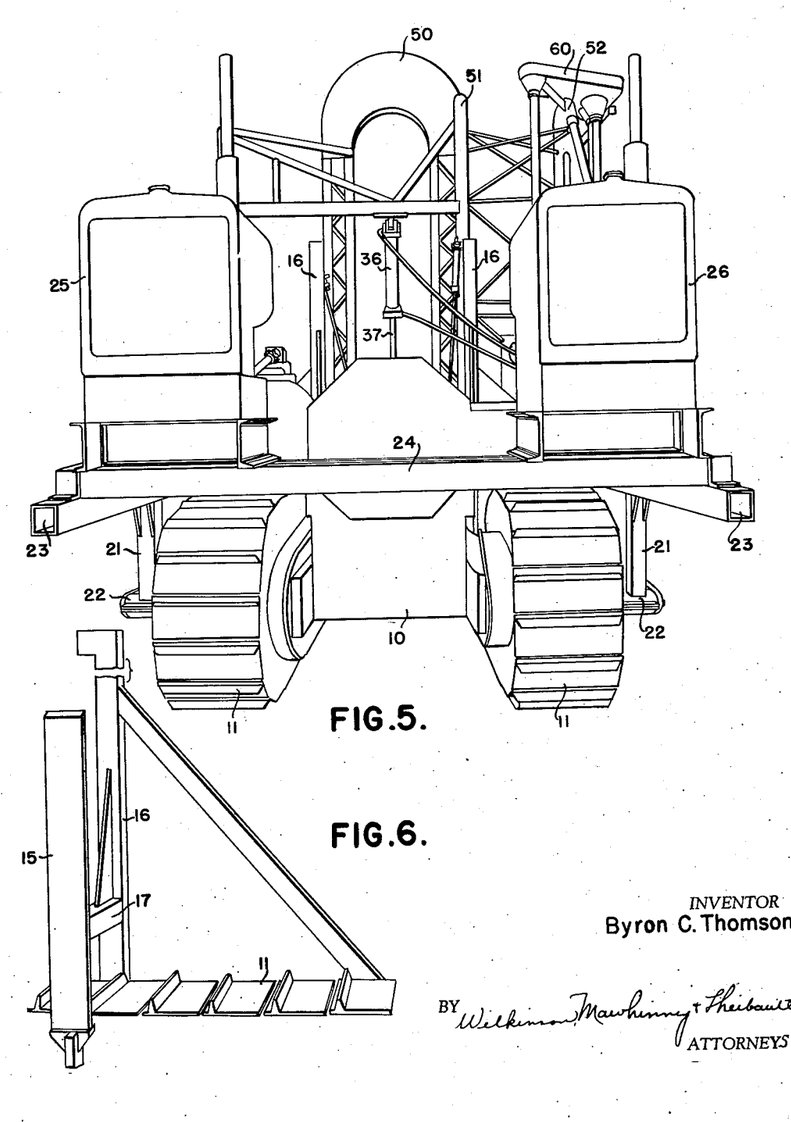
FIGURE 5 is a rear isometric view of the combined tractor and harvester illustrating the swivel mounting at both sides of the crawler tractor and the two engines mounted on the rear extension counterbalance frame of the harvester for operating the essential harvesting assemblies.
FIGURE 6 is a fragmentary isometric view showing the attachment of the stanchions and rub plates to the tractor frame.
Figures 7, 14, 15:
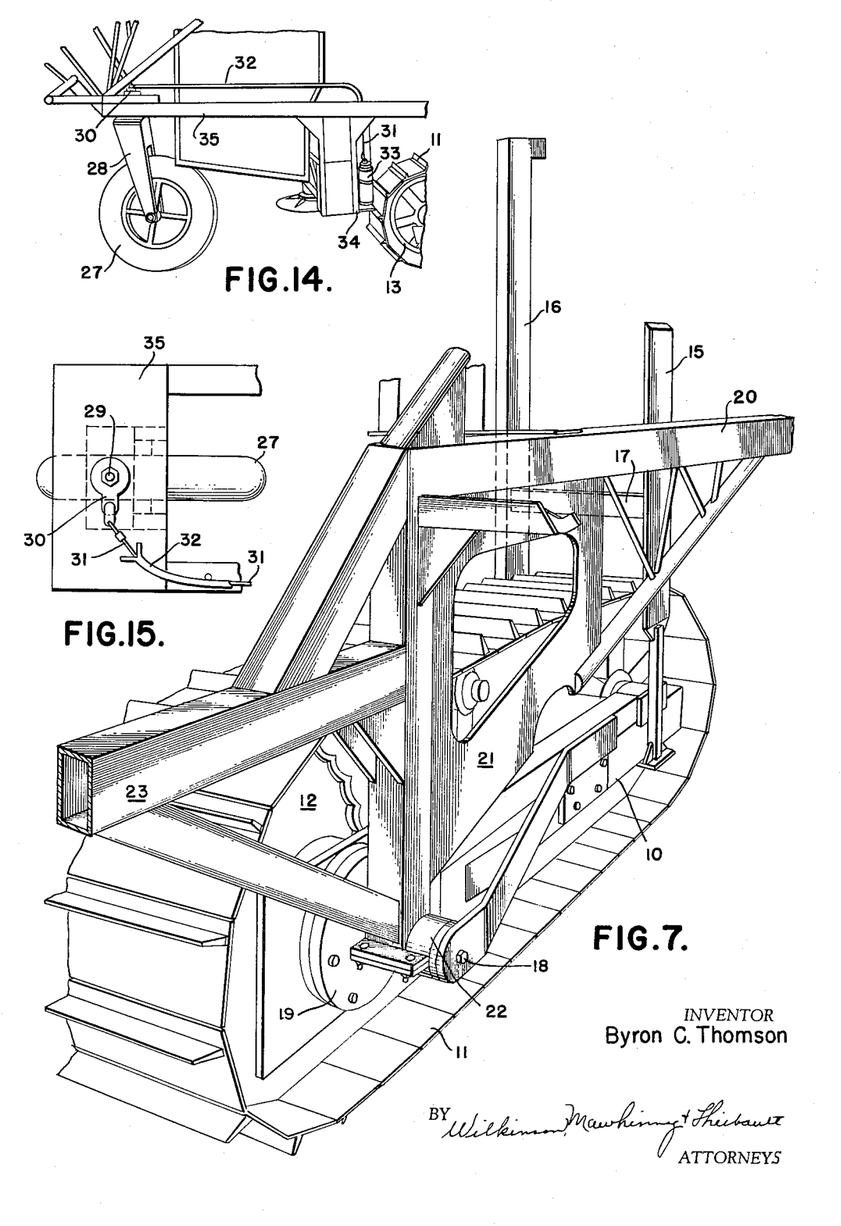
FIGURE 7 is a fragmentary isometric view of the swivel mounting of the harvester to the rear axle of the tractor and associated parts.
FIGURE 14 is a fragmentary isometric view of the front portion of the harvester showing the gauge wheel and its mount and counterbalance.
FIGURE 15 is a top plan view of the front portion of the harvester showing also the mounting and connections to the gauge wheel.

Extending vertically up from the tractor frame on the outside of the tracks 11 are wear or rub plates 15 for which see FIG. 1 and also FIGS. 6 and 7. Also extending upwardly from the frame 10 of the tractor on the insides of the tracks 11 are upright stanchions 16 which are connected with the rub plates 15 by cross pieces 17 extending above the endless tracks 11.

The tractor is provided with an elongated rear axle 18 about which are arranged thrust or wear plates 19 attached to the frame 10 inwardly of the outer ends of such elongated axle 18.

The harvester is mainly comprised of side frame members 20 which contain all essential harvesting assemblies and which are two in number being located outwardly of the sides of the tractor endless tracks 11 and being suitably tied together crosswise by appropriate transverse members, such frame members being provided at their rear ends with dropped bearing trusses 21 having dropped bearings 22 which extend about the portions of the elongated rear axle 18 which extend out beyond the thrust of wear plates 19 all of which is clearly shown in FIGURES 5, 6 and 7.

Rear extension counterweight frames 23 (FIGURES 1 and 5) extend backwardly from the rear ends of the harvester side frame members 20, such longitudinal members 23 supporting cross members 24 upon which are installed diesel or other engines 25 and 26 for operating the harvesting assemblies. These engines 25 and 26 also serve as counterweights for the harvester all of which latter extends forwardly of the pivot point 18 while the rear frame and the engines 25, 26 carried thereby extend rearwardly of such axle or pivot point 18.

Depending at the front portion of the harvester frame 20 is a gauge or "crazy" wheel 27 carried by a fork 28 mounted upon a swivel stud 29 (FIGURES 14-15) having an arm 30 affixed thereto to which is attached one end of a cable 31 running through a tube 32 to a counterweight 33 slidable up and down in a housing 34. These various parts may be carried in a forward extension 35 of the harvester frame at one side of the center thereof for which see FIGURES 14 and 15.

Figure 8:
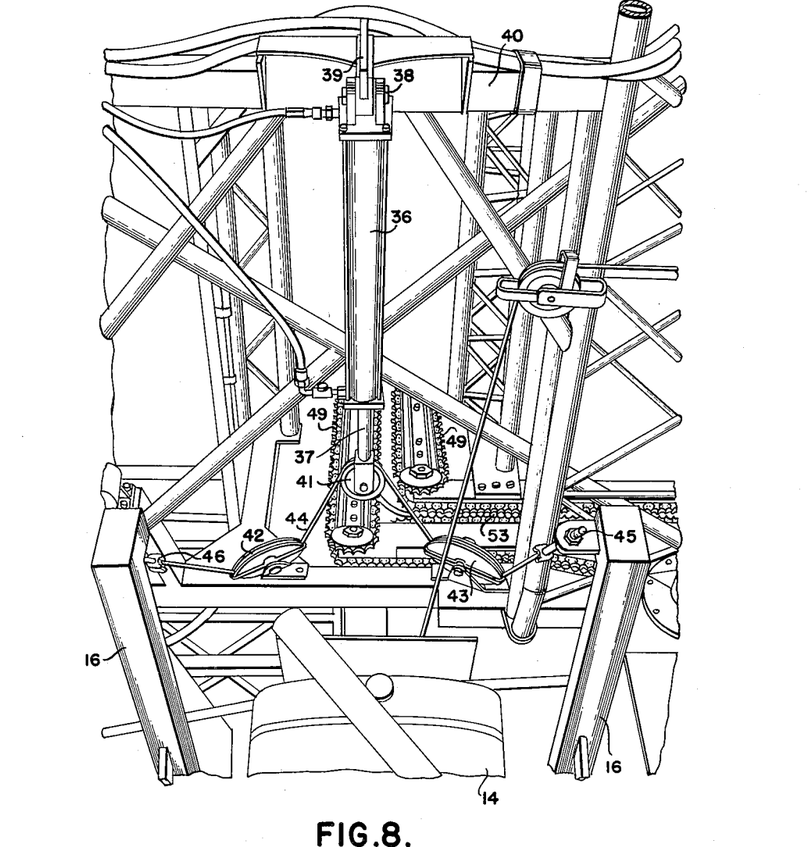
FIGURE 8 is a fragmentary isometric view taken rearwardly of the tractor engine and stanchions and looking forwardly and illustrating particularly the device for raising and lowering the forward portion of the harvester about its swivel support.

Referring more particularly to FIGURE 8 there is therein illustrated a device for raising and lowering the forward portion of the harvester frame 20 about its swivel or pivot point 18, such means, in the instance shown, comprising a hydraulic cylinder 36 and its ram or piston 37. The upper end of the cylinder 36 is pivoted on the pivot 38 to a bracket 39 carried by a cross frame piece 40 of the harvester frame. The ram 37 slides up and down through the lower end of the cylinder 36 and carries at its lower end a rotary sheave 41 which is disposed forwardly and adjacent the space between two pulleys 42 and 43 which are rotatably mounted on the harvester frame adjacent the upright stanchions 16 which, as heretofore stated, are carried by the frame of the tractor. A cable 44 has its intermediate portion trained about the sheave 41 with its end portions rove beneath the pulleys 42 and 43 and having the terminal ends thereof anchored, as indicated at 45 and 46 to upper end portions of the stanchions 16.

Figures 10, 11:
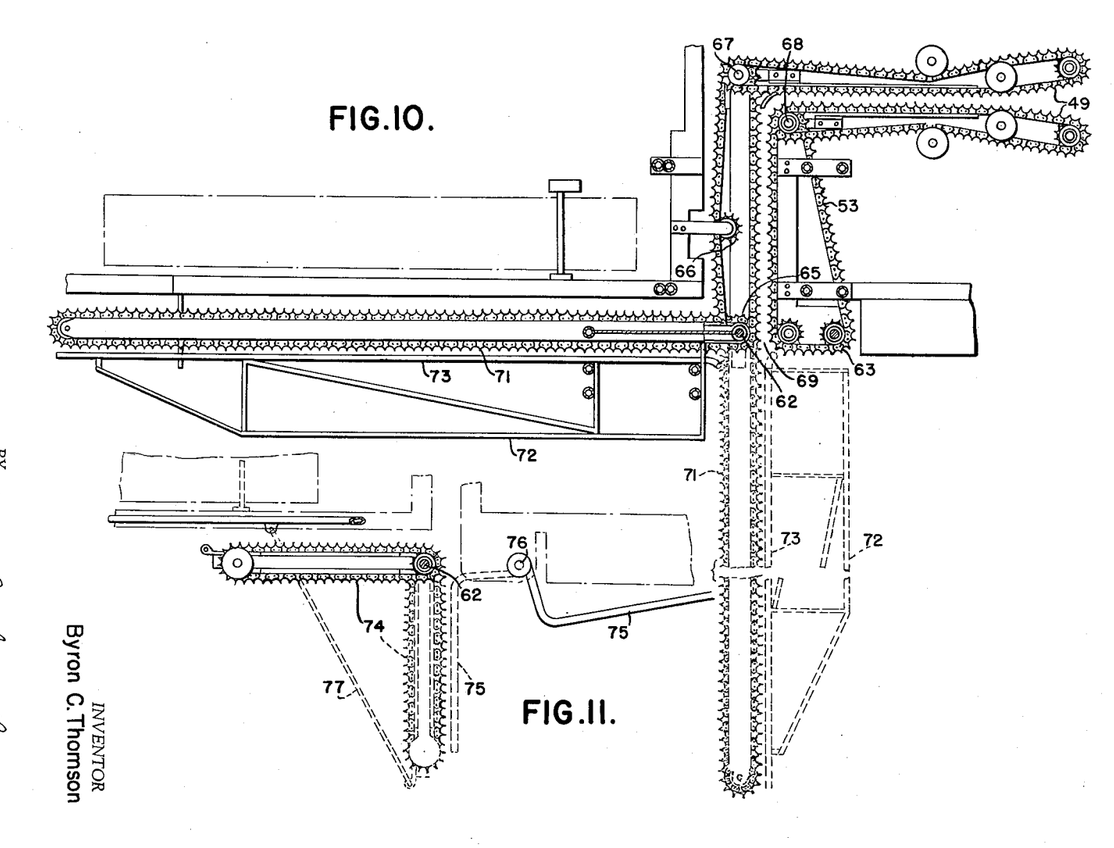
FIGURE 10 is a plan view of the longitudinal and lateral path through the harvester for the cane stalks, illustrating sticker chains and also a foldable extension chain in both full and dotted line positions for moving the severed stalks out to a remote heap row.
FIGURE 11 is also a plan view showing a foldable piler chain in both full and dotted line positions with a brace indicated in the dotted line position to hold this chain extended for moving the stalks to a near heap row.

In FIGURE 1 and some of the other figures are disclosed lower gathering chains 47 and upper gathering chains 48, these being conventional and mounted in pairs for receiving the cane stalks therebetween and passing such stalks to the harvester center carrier chains 49 (usually sticker chains, FIG. 10). These center carrying chains 49 conduct the canes through the forward arch 50 (FIG. 3) and then laterally through the inner lateral arch 51 and the outer lateral arch 52 by means of the cross carrier chains 53 (FIG. 10).

During their passage the canes encounter the adjustable topper 54 and subsequently the bottom cutter 55, both of which may be conventional and both being arranged to be driven from one of the engines 25 carried on the counterweight frame 23.

Figure 2:
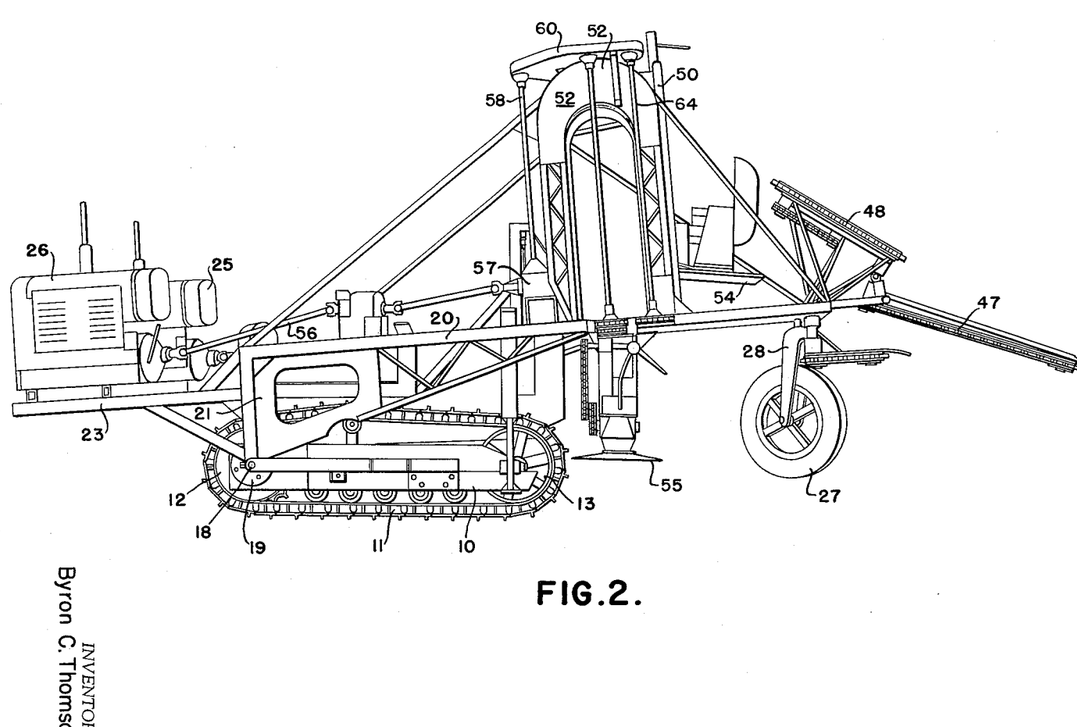
FIGURE 2 is a similar view showing the raised position of the harvester with the gauge wheel completely off the ground and the harvester in an inclined position.
Figure 3:
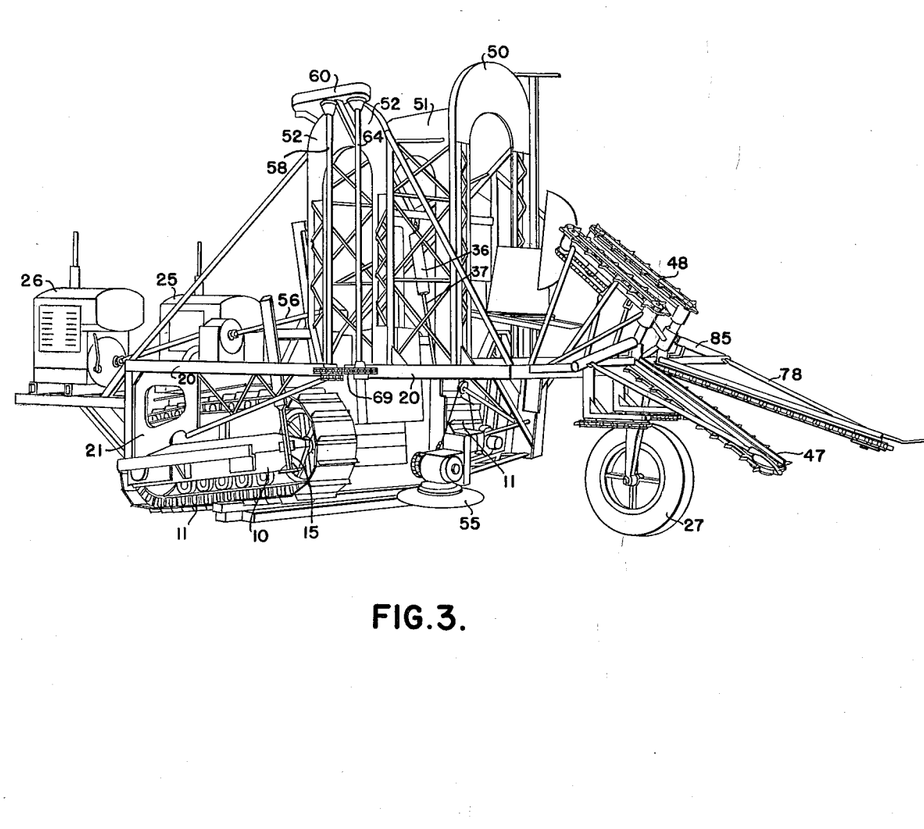
FIGURE 3 is also an isometric view of the improved harvester taken from a more forward position with the gauge wheel in operative position upon the ground, the harvester frame in a normal substantially horizontal plane but with the tracks of the tractor elevated as though passing over an obstacle or inclined ground.
Figure 9:
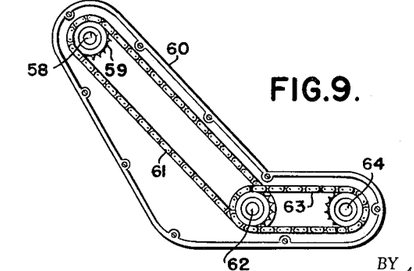
FIGURE 9 is a sectional view of the top gear casing showing an arrangement of chains and sprockets for driving some of the harvesting assemblies.

As appears in FIGURES 1 to 3 a shaft 56 is driven from the engine 26 and extends forwardly to a gear case 57 containing bevel gears for transmitting the drive to a vertical shaft 58. On the upper end of this shaft is fixed a sprocket 59 (FIGURE 9) contained in a gear housing 60. The sprocket 59 drives a chain 61 which in turn through sprocket arrangements drives a shaft 62, the latter in turn driving a chain 63 which communicates rotary motion to a second shaft 64 all disposed in the casing 60. As shown in FIGURE 1 the shafts 62 and 64 extend vertically downward from the upper gear housing 60 and at their lower ends are drivingly affixed to sprockets 65 and 66 (FIGURE 10) which are enmeshed with the cross carrier chains 153 for the purpose of driving the same. The cross chains 153 through sprocket and shaft gearing 67 and 68 drive the main center carrier chains 49. The cross carrier chains 153 extend forwardly of the treads of the tractor so as to carry the cane stalks to the discharge gap or mouth 69 where the same may be delivered to a harvester piler disclosed in my prior Patent 2,427,313 to be distributed into heap rows or piles on the ground.

As shown in FIGURE 10, a long sticker chain 71 may be arranged to pivot about the shaft 62, the same together with its pressure bar 73 being carried by a foldable frame 72 which also pivots about the shaft 62 and is movable to the full and dotted line positions of FIGURE 10. When in the full line position this piling chain is disposed alongside the harvester out of the way but when its use is required it is swung outwardly to the dotted line position so that it is in line with the gap 60 so as to receive the cane therefrom.

As illustrated in FIGURE 11, a short sticker chain 74 may be mounted also to swing around the shaft 62, above or below the long sticker chain 71, and its pressure bar 75 swings about a pivot 76 on the harvester frame, being movable between the full and dotted line positions shown. When the short sticker chain 74 is moved out to the dotted line position a stay rod 77 may be coupled between the harvester frame and the outer end of the sticker rod frame for the purpose of holding the same in the extended position. The short chain may be used where the harvester is travelling adjacent the heap row being formed, and the long chain 71 when the harvester is two or tree rows remote from the heap row or pile.

Figure 4:
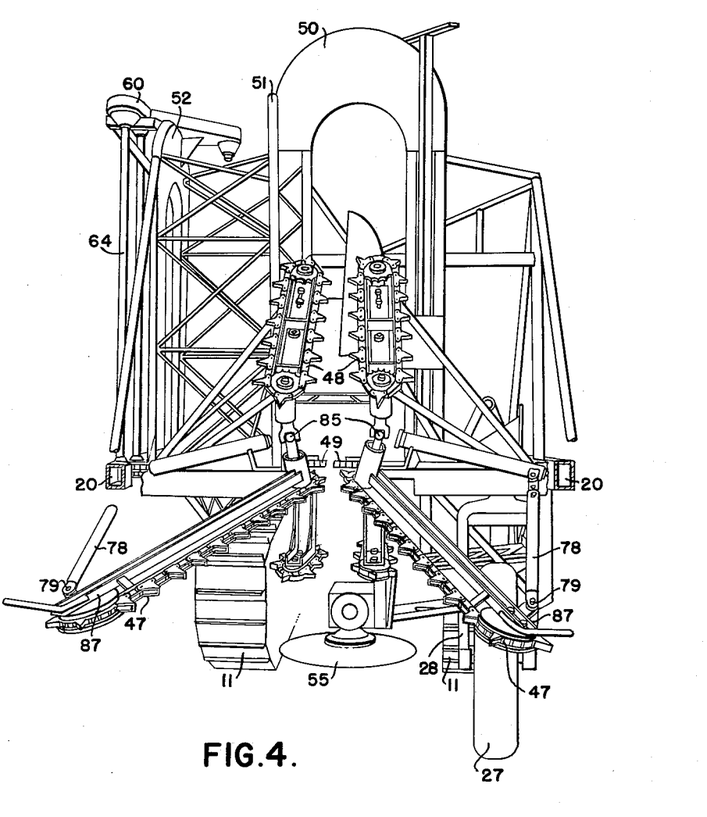
FIGURE 4 is an isometric front elevational view of the improved harvester showing the relation of the tractor tracks and the gauge wheel thereto.
Figure 12:
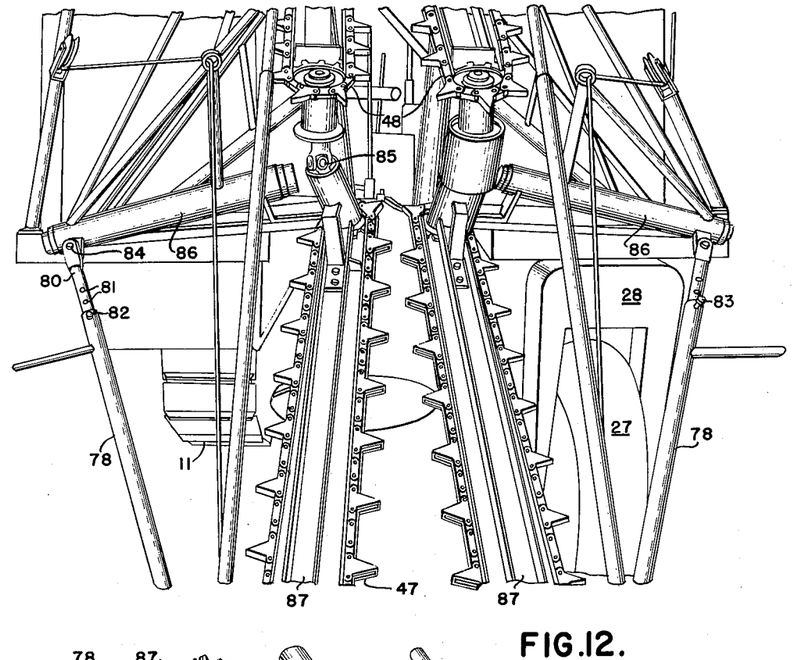
FIGURE 12 is a fragmentary isometric view taken from the front portion of the harvester and showing the adjusting devices for widening or narrowing the gap or throat between the gathering chains.
Figure 13:
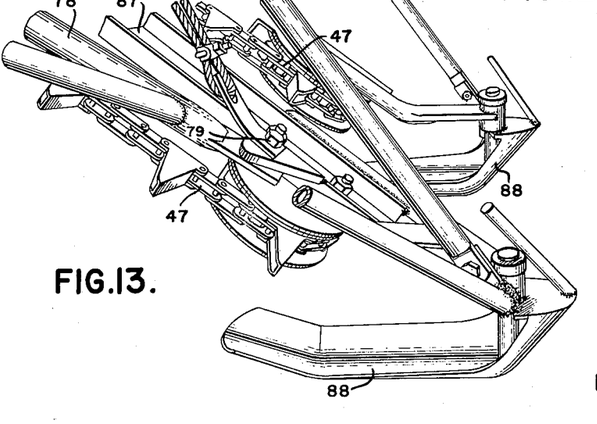
FIGURE 13 is a fragmentary isometric view being a continuation of the front part of FIGURE 12 showing the extreme forward portions of the lower gathering chains, the ground engaging shoes and associated parts.

Referring more particularly to FIGURES 4, 12 and 13, it will be apparent from FIGURE 4 that there is a comparatively wide divergence between the gathering chains 47; whereas in FIGURE 12 the throat between these chains is considerably narrower. This is accomplished by side adjusting hollow rods 78 which are pivoted at their lower ends 79 to lower portions of the frames 87 of the gathering chains 47. The upper ends of the hollow rods 78 telescopically receive therein stub rods 80 having series of perforations 81 adapted to register with the single aperture 82 in each of the rods 78 for the passage of a pin or detent 83. The stub rods are pivoted at 84 to other members 86 of the frame which carries the lower portions of the gathering chains 47 and raises and lowers the same and also drives such chains. By the arrangement just described the rods 78 may be lengthened or shortened by selectively engaging the pin 83 in the perforations and aperture 82. By shortening the rods 78, the gathering chains 47 may be spread and by lengthening the rods 78 the gathering chains 47 will be caused to move together. The lower ends of the frames 87 of the gathering chains may carry shoes 88, as appears in FIGURE 13 to ride along the ground and to enable the lower ends of the gathering chains to approach very closely to the ground for dealing with bent or down cane.

In the use of the machine, the propulsion is derived from the crawler tractor and the essential harvesting assemblies, all of which are more or less conventional, are carried by that portion of the harvester frame 20 which extends in advance of the foremost portion of the tractor tracks 11. The weight distribution is such that the center of mass or center of gravity of the harvester frame 20 is somewhat forward of the swivel axis 18 by which alone the harvester is connected to the tractor whereby the harvester 20 is free to move up and down in a substantially vertical plane about this axis 18 and in turn the tractor and its tracks 11 are also free of the harvester to independently move up and down about this same axis 18 in following upwardly and downwardly sloping contours which require upward and downward tilting attitudes of the tractor due to the elongated nature of the tracks or treads 11 which contact the ground and support the tractor and also the superposed major weight of the harvester and in some cases the entire weight. However normally, in the position of FIGURE 1, which is the position assumed during cutting and piling of cane, the center of gravity is so located that it will dispose the forward portion of the harvester to rest with a proportion of its weight upon the gauge wheel 27 which therefore travels along in contact with the ground supporting the forward portion of the harvester and riding up and down and causing the forward portion of the harvester to also ride up and down as the wheel 27 encounters inequalities in the surface of the ground. Thus the harvester may pivot up and down about the axis 18 incident to the wheel 27 following the contours of the ground and this up and down movement of the harvester will in no way affect the position of the treads 11 of the tractor at all times in contact with the ground. Also the tractor may move up and down inclinations and declinations in the ground surface by which the tractor will pivot about the axis 18 without affecting the position assumed by the harvester at any particular time. Thus the tractor may constantly perform a propulsion function with respect to the harvester, but the connection between the two elements is such that neither disturbs the necessary motions of the other in traveling over the surface of the ground. It is important that the harvester have this up and down freedom of motion without regard to any similar motion of the tractor because of the fact that the lower ends of the gathering chains 47 should always be very close to the ground to pick up down cane. The counterweight arrangement is calculated to assist the wheel 27 and in relieving the wheel 27 from too great a load. The action of the wheel 27 must be sensitive and there must be full and easy response in the harvester to the lifting and lowering action of the wheel 27.

FIGURE 3 shows the harvester in a substantially horizontal position of actual use with the wheel 27 on the ground while the tractor is in an upwardly inclined position while climbing up a hill or over an obstruction, this figure illustrating that such movements in the tractor are not communicated to the harvester, but despite the various angular positions assumed by the tractor the harvester remains in the position of use with the wheel 27 upon the ground and following the contours thereof.

FIGURE 2 shows that while the treads 11 of the tractor are in a substantially horizontal position, the harvester frame has been tilted with the forward portion including the wheel 27 elevated above the ground. In this position the entire weight of the harvester, including all assemblies and including also the engines 25, 26, is borne by the tractor. This position is brought about by the action of the pneumatic motor or hydraulic ram shown in FIGURE 8. When the ram 37 is moved to the upper position in the cylinder 36 as shown in this FIGURE 8, the sheave 41 will exert a lifting force on the cable 44, the ends of this cable being anchored in the stationary stanchions 16 affixed to the tractor, such lifting force will become effective beneath the pulleys 42 and 43 and as these pulleys are attached to the harvester frame a lifting force will be communicated to that frame. In other words, when the ram moves to its raised position it tends to draw two branches of the cable 44 taut. However, when the ram 37 is lowered, for instance, as shown in FIGURE 3, the sheave drops down and slackens the cable 44 so that the forward portion of the harvester may drop proportionately lowering the wheel 27 to the ground. This mechanism of FIGURE 8 has a further function in that the pressure of hydraulic fluid to the cylinder 36 may be such that it will hold the ram 37 in a predetermined or selected lower position, sufficient to enable the gauge wheel 27 to engage the ground and to follow inequalities in the ground which might be regarded as normal but preventing the wheel from dropping into sharp depressions or into open ditches which abound in irrigated fields. In other words, this hydraulic motor may be regulated to limit the degree of angular descending movement in the forward portion of the harvester frame.

In the raised position of FIGURE 2, the counterweight 33 (FIGURES 14 and 15) will tend to maintain the wheel 27 in the direction of forward movement of the machine whereupon on subsequent descent of the forward portion of the tractor, the wheel will be in proper alignment to engage the ground and roll along in a proper plane of forward movement; otherwise due to the swivel mounting of this wheel 27 the same might swing of its own accord or be blown by a wind into a position in which the wheel was crosswise to the direction of forward movement and thus might become damaged when subsequently lowered in this position to the ground.

It will be understood that in moving up and down, the harvester frame 20 or wear plates thereof will engage the outside surfaces of the rub plates 15 carried by the tractor. These rub plates 15 act as guides confining the harvester frames 20 to a substantially vertical path of movement and in this sense these plates 15 prevent any side twists at the pivot axis 18 where the harvester frame is attached to the crawler tractor. These plates 15 add measurably to the stability of the harvester frame. A corresponding action takes place when the crawler tracks encounter an elevation or depression of the earth and are raised or lowered out of their normal position. In this event the rub plates 15 are carried up and down with the frame of the crawler tractor and they rub against the sides of the harvester frame 20 thus stabilizing the movement of the crawler tractor about the swivel axis 18. Thus, the parts 15 and 20 jointly maintain both tractor and harvester to a substantially true vertical path incident to their relative angular movements about one another. Therefore, no matter how uneven the ground the level stability of the harvester frame is not affected.

It will be noted that the harvester is not an "outboard" mounted harvester, but that it is mounted centrally over the tractor enabling the two treads 11 of the tractor to straddle the cane row with the harvester center carrier chains 49 directly forward of the space between the treads 11 so that the weight of the harvester is superimposed upon the tractor and the alignment of the tractor and harvester is conducive to a combination of a much lighter harvester and a less expensive tractor. The arrangement, however, requires that the cane be delivered out of the side of the harvester ahead of the crawler tractor.

It will be appreciated that what might be called the "semi-mounting" of the harvester on the tractor enables all of the harvester weight or only a part of it to be carried by the tractor, and in effect, the tractor may push the harvester with a proportion of the weight on the front wheel 27 or carry all of the weight on its own tracks 11.

It will also be appreciated that the swivel mounting of the harvester allows the tractor to rise or fall within the harvester frame or the harvester frame to rise or fall outside the tractor without in any way disturbing the relationship between harvester and tractor.

While the front gathering chains 47 have heretofore been subject to vertical adjustability, no practical adaptation of adjustability in a lateral sense has been achieved. This lateral adjustment has important results in harvesting cane that is not particularly erect. When sugar cane being harvested is straight and erect, the gathering chains can be closer together than they could if the cane is badly down and spread out on the ground. This is particularly true where cane is planted in rows and where the middles are somewhat deeper than the cane rows.

Preferably two engines 25 and 26 are employed on the counterbalance platform or extension frame 23, 24. As heretofore stated the engine 26 is connected to drive the harvester gathering chains, central and lateral carrier chains and the piler device. The other engine 25 is employed for driving the hydraulic system and cane cutting and topping blades. These particular connections are conventional and are not a part of the present invention.

Referring to FIGURE 4, the reference numeral 85 designates the universal drive connection between the upper and lower gathering chains 48, 47 which will permit of the divergent movement of the lower gathering chains 47 as illustrated in this figure and also the movement of the chains 47 to the more constricted throat position of FIGURE 12.

The improved harvester is available for crawler tractors in the rated capacity of Allis-Chalmers HD6, Caterpillar's D4 and International's TD6. The improved harvester is simply superimposed upon a standard crawler tractor with only such additions and modifications to the tractor as hereinbefore described with the exception of bracing which is added and some of which has been illustrated in the drawings without particular reference thereto as the same forms no particular part of the invention.

All cane handling assemblies including the bottom cutting knife are supported by the harvester frame in such a manner that when the tractor tracks run over uneven ground they rise or fall within the harvester frame thereby not affecting any of the important harvesting assemblies including the pickup chains or the bottom and top cutting knives. With conventional tractor-mounted harvesters, when the tractor passes over uneven ground and rises or falls, all harvesting assemblies including the bottom and topping knives rise and fall with the up and down movement of the tractor, thus making it impossible to cut the cane at top or bottom with any degree of regularity. Accordingly, the mounting of the harvester upon the tractor according to the present invention allows all harvesting assemblies to maintain a fixed position in relation to the ground without regard for the up or down motion of the tractor itself. Another advantage of the present invention is the fact that when desired (for turning or backing up in tight places) the front harvester "crazy" wheel can be raised clear of the ground so that all of the harvester weight is borne by the tractor.

The semi-mounted three point suspension harvester where one point of contact with the earth is the rear axle of the crawler harvester, the other is the front crazy wheel that the bottom and top cutting knives are located only a short distance ahead of the crawler tracks, but about in the center between front and rear ground connections. This means that these two cutting knives are subjected to the least possible up and down motion when either the front crazy wheel or the rear tracks run over uneven ground. The three point suspension provides that the cutting discs are located centrally between the single front wheel and mounting points at the rear of the crawler tracks. This design assures uniform cutting not possible with tractor mounted forward cutters.

In further explanation of this fact, compare a complete tractor-mounted harvester. In this latter case, when the crawler tractors or wheels of the rubber tired tractor run over any bumps or hollows in the ground, the cutting knife located in front of the tractor is subjected to the maximum rise and fall rather than the minimum, as in the case of the semi-mounting. In other words, the semi-mounting allows these cutting knives to be located in the center of the unit rather than the extreme end.

Although I have disclosed herein the best form of the invention known to me at this time, I reserve the right to all such modifications and changes as may come within the scope of the following claims.

What is claimed is:

1. For use with a crawler type tractor having front and rear axles, a cane harvester comprising a frame straddling said tractor and extending forwardly and rearwardly of said tractor, cane gathering means on the frame forwardly of the tractor, cane topping and cutting means on said frame rearwardly of said gathering means substantially on the longitudinal axis of the tractor, cane conveying means carried by said frame and disposed rearwardly of cane topping and cutting means and positioned to receive said cut cane and convey same in substantially a vertical position in a direction substantially normal to the direction of travel of said tractor to deposit the cane on the ground clear of the path of travel of the tractor, pivotal mount means adjacent the rear of said harvester frame and connecting said harvester frame to said tractor proximate the rear axle of said crawler tractor with a portion of the frame extending forwardly of the pivot and a portion extending rearwardly thereof, harvester drive means carried on one portion of said frame, and harvester elevating and lowering means connecting the crawler tractor to said frame to one side of the pivot between the tractor and harvester frame to elevate the harvester during transport.

2. A cane harvester as claimed in claim 1 wherein said cane gathering means has a throat for introducing the cane to said topping and cutting means further comprising means for varying the divergency of said throat.

3. A cane harvester as claimed in claim 1 further comprising a ground wheel carried by the harvester frame forwardly of said cane topping and cutting means.

4. A cane harvester as claimed in claim 1 in which the harvester drive means is carried by the harvester frame rearwardly of its pivotal connection to the tractor to counterbalance the weight of the gathering means, topping and cutting means and conveying means.

5. A cane harvester as claimed in claim 1 in which the pivotal mount means is on the rear axle of the crawler tractor.

6. A cane harvester as claimed in claim 1 in which the harvester drive means is connected to drive said cane gathering means and said cane conveying means.

7. A cane harvester as claimed in claim 1 wherein said cane conveying means has a longitudinal and connected lateral passages for cane, the lateral passage opening in advance of the tractor.

References Cited in the file of this patent

UNITED STATES PATENTS

| | | |
|---|---|---|
| 1,726,043 | Scranton | Aug. 27, 1929 |
| 2,435,334 | Wurtele | Feb. 3, 1948 |
| 2,471,771 | Parks et al. | May 31, 1949 |
| 2,496,514 | Andrews et al. | Feb. 7, 1950 |
| 2,532,904 | Guild | Dec. 5, 1950 |
| 2,669,829 | Pugh | Feb. 23, 1954 |
| 2,724,228 | Duncan | Nov. 22, 1955 |
| 2,736,152 | Andrews et al. | Feb. 28, 1956 |
| 2,851,841 | Aber et al. | Sept. 16, 1958 |